US009457574B2

(12) United States Patent
Paschkewitz

(10) Patent No.: US 9,457,574 B2
(45) Date of Patent: Oct. 4, 2016

(54) PROCESS TO FABRICATE AN INJECTION MOLDED PRINTHEAD WITH INKJET NOZZLE FACE PLATE

(71) Applicant: Palo Alto Research Center Incorporated, Palo Alto, CA (US)

(72) Inventor: John S. Paschkewitz, San Carlos, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 403 days.

(21) Appl. No.: 14/139,410

(22) Filed: Dec. 23, 2013

(65) Prior Publication Data
US 2015/0174829 A1 Jun. 25, 2015

(51) Int. Cl.
*B29C 69/02* (2006.01)
*B29C 45/00* (2006.01)
*B29C 59/02* (2006.01)
*B29C 71/02* (2006.01)
*B41J 2/16* (2006.01)
*B29K 67/00* (2006.01)
*B29K 23/00* (2006.01)
*B29K 101/12* (2006.01)
*B29L 31/00* (2006.01)

(52) U.S. Cl.
CPC ............. *B41J 2/1632* (2013.01); *B41J 2/162* (2013.01); *B41J 2/1637* (2013.01); *B41J 2/1639* (2013.01); *B29C 45/00* (2013.01); *B29K 2023/38* (2013.01); *B29K 2067/046* (2013.01); *B29K 2101/12* (2013.01); *B29K 2995/0012* (2013.01); *B29L 2031/767* (2013.01)

(58) Field of Classification Search
CPC . B29C 45/00; B29C 2033/525; B29C 33/52; B41J 2/162; B41J 2/1631; B41J 2/1639
USPC .......................................... 264/234
See application file for complete search history.

(56) References Cited

U.S. PATENT DOCUMENTS 3,535,481 A   10/1970   Korb
5,255,022 A * 10/1993   Burolla ................. B29C 65/606
                                                    347/63
5,479,684 A    1/1996   Murphy et al.
6,283,588 B1   9/2001   Brandon et al.
8,092,000 B2   1/2012   Alavizadeh et al.

OTHER PUBLICATIONS

Dong et al., "Chemical Treatment of Poly(lactic acid) Fibers to Enhance the Rate of Thermal Depolymerization", Applied Materials & Interfaces, Feb. 2012, vol. 4(2), pp. 503-509.
Li et al., "Sacrificial Polymers for Nanofluidic Channels in Biological Applications", Nanotechnology 14, 2003, pp. 578-583.
Zhu et al., "Fabrication of Polymer Via Holes by a Combination of Hot Embossing and Indentation Processes", J. Micromech. Microeng., 21, 2011, 8 pages.

* cited by examiner

*Primary Examiner* — Alison L Hindenlang
*Assistant Examiner* — Mohamed K Ahmed Ali
(74) *Attorney, Agent, or Firm* — Hollingsworth Davis, LLC

(57) ABSTRACT

Methods of fabricating a printhead having integrated inkjet nozzles are disclosed. The methods include injection molding the printhead having a plurality of manifold features and embossing jet features extending between the manifold features and an outer surface of the printhead.

19 Claims, 8 Drawing Sheets

PROCESS TO FABRICATE AN INJECTION MOLDED PRINTHEAD WITH INKJET NOZZLE FACE PLATE

SUMMARY

Some embodiments of a method of fabricating a printhead having integrated inkjet nozzles include injection molding the printhead having a plurality of manifold features that lead up to a nozzle surface. The plurality of manifold features are filled with a sacrificial material, and the nozzle surface layer is heated to above a glass transition temperature. Jet features are embossed in the printhead using an embosser having members that penetrate through the nozzle surface layer to the sacrificial material. The sacrificial material and the embosser are then removed to provide the printhead having inkjet nozzles.

Certain embodiments of a method of fabricating a printhead having integrated inkjet nozzles include injection molding the printhead having a plurality of manifold features that are covered by a nozzle surface layer. The plurality of manifold features are filled with a sacrificial material, and the nozzle surface layer is heated to above a glass transition temperature. Jet features are embossed in the printhead using an embosser having members that penetrate through the nozzle surface layer to the sacrificial material. The sacrificial material and the embosser are then removed to provide the printhead having inkjet nozzles.

Some embodiments of a method of fabricating a printhead having integrated inkjet nozzles include injection molding the printhead having a plurality of manifold features that include voids on an outer surface of the printhead. The plurality of manifold features are filled with a sacrificial material, and the outer surface is covered with a melted polymer that forms a nozzle surface layer over the voids. Jet features are embossed in the printhead using an embosser having members that penetrate through the nozzle surface layer to the sacrificial material. The sacrificial material and the embosser are then removed to provide the printhead having inkjet nozzles.

BRIEF DESCRIPTION OF THE DRAWINGS

In the following diagrams, the same reference numbers may be used to identify similar/same/analogous components in multiple figures. The drawings are not necessarily to scale.

DETAILED DESCRIPTION

The following is a detailed description of the various embodiments with reference to the accompanying drawings, wherein like elements are designated by like numerals. It should be clearly understood that there is no intent, implied or otherwise, to limit the disclosure in any form or manner to that illustrated and/or described herein. With the instant disclosure as a guide, modifications, alternatives and/or additional embodiments may become apparent to a person having ordinary skill in the art. All such embodiments, and modifications thereof, are considered as being within the metes and bounds of the instant disclosure as defined by the appended claims and any and all equivalents thereof.

Figure 1A:
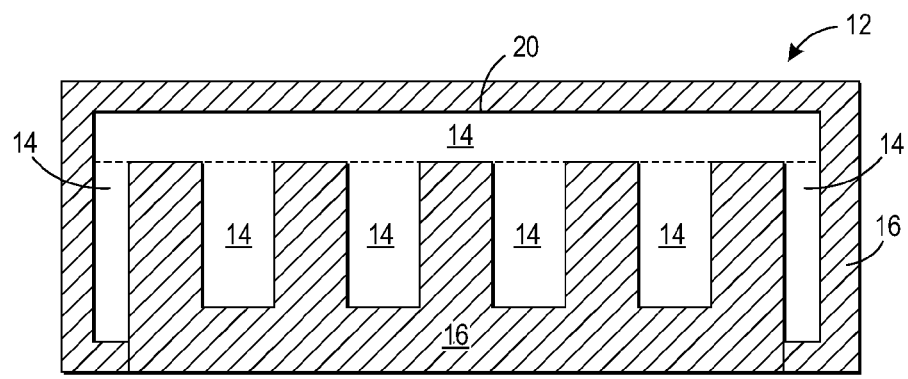
FIGS. 1A-1F illustrate an embodiment of a method of fabricating a printhead having a plurality of integrated inkjet nozzles.
Figure 1B:
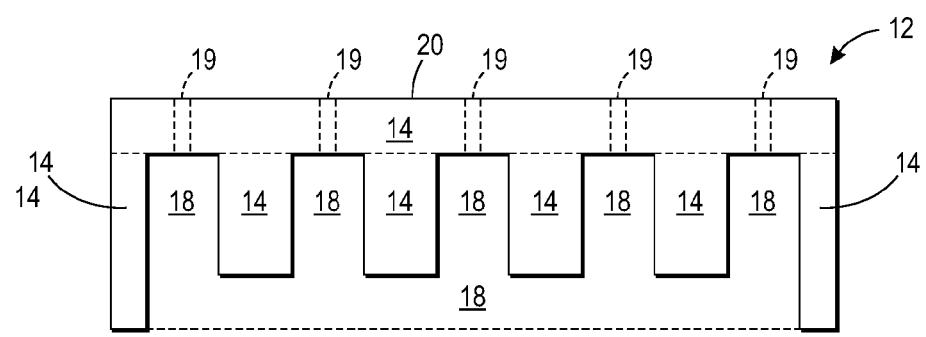

FIGS. 1A-1F illustrate an embodiment of a method of fabricating a printhead having a plurality of integrated inkjet nozzles. As seen in FIG. 1A, a printhead body 12 is molded (e.g., formed) by injecting a material 14 into a high precision injection mold 16. In some embodiments, the mold 16 is configured to yield the molded printhead body 12 having a plurality of manifold features 18 covered by a material to form a nozzle surface layer 20 as seen in FIG. 1B. In certain embodiments, the mold 16 is configured to yield the molded printhead body 12 wherein the plurality of manifold features 18 include voids (e.g., optional voids 19) through an intermediary surface under the material of the nozzle surface layer 20. As illustrated, the manifold features 18 of the printhead body 12 lead up to the material of the nozzle surface layer 20.

Figure 1C:
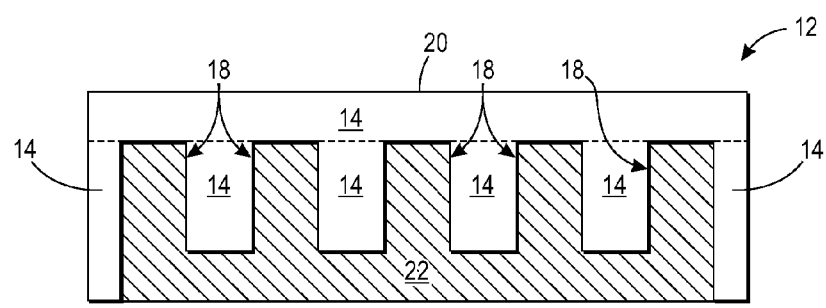

As shown in FIG. 1C, the manifold features 18 are filled with a sacrificial material 22 after the printhead body 12 has been removed from the mold 16 and cooled. The nozzle surface layer 20 is then heated to a temperature that is above a glass transition temperature $T_g$ of the material 14 used for the printhead body 12 and below the decomposition (or gasification) temperature of the sacrificial material 22. As will be apparent, the sacrificial material 22 should have a decomposition (or gasification) temperature that is both greater than the glass transition temperature $T_g$ and less than a melting temperature $T_m$ of the material 14 used for fabricating the printhead body 12.

For applications wherein the printhead is configured for use with solid ink, the material 14 used for the printhead body 12 is selected to be compatible for use with the high operating temperatures of the liquefied solid ink. Accordingly, the printhead body 12 for such applications is made of a material for which the glass transition and melting temperatures are respectively below and above approximately 400 degrees C. Materials compatible for such applications, as are well known in the art, include thermoplastic polymers and resins such as polysulfone and polyether ether ketone (PEEK). As such, the sacrificial material 22 can include a polymer such as polynorbornene (PNB) and equivalents thereof.

For applications wherein the printhead is configured for use with aqueous ink, the material 14 used for the printhead body 12 is selected to be compatible for use with the aqueous ink at an operating temperature relatively lower than that of liquefied solid ink. Accordingly, the glass transition and melting temperatures, respectively, of the material 14 used for fabricating the printhead body 12 is below and above approximately 280 degrees C. Materials 14 compatible for such applications, as are well known in the art, include thermoplastic polymers such as polyethylene. As such, the sacrificial material 22 can include a thermoplastic polyester such as poly-lactic acid (PLA) and equivalents thereof.

Alternate materials (or compositions) 14 that can be used for fabricating the molded printhead body 12 and/or as the sacrificial material 22, as may become apparent to a person having ordinary skill in the art, are considered as being within the metes and bounds of the instant disclosure.

Figure 1D:
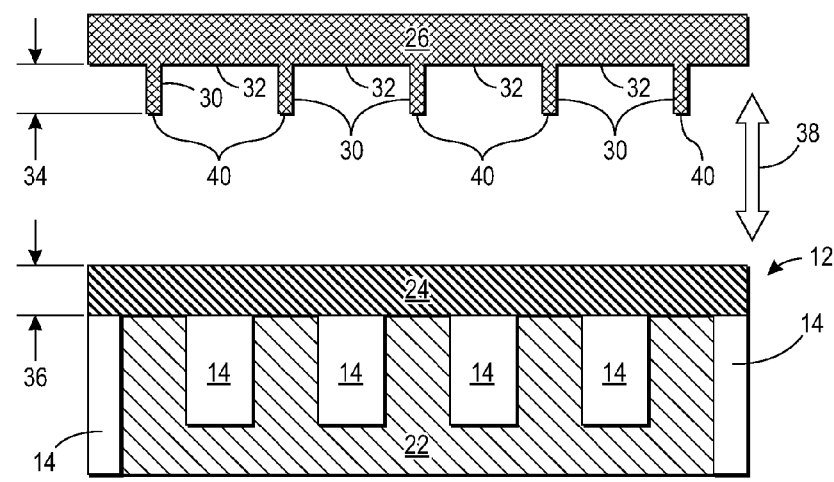

When heated as previously described, the material of the the nozzle surface layer 20 reversibly transitions into a molten or rubber-like nozzle surface layer 24 while the solid sacrificial material 22 is retained within the manifold features 18. FIG. 1D illustrates an embodiment of a nozzle master die 26 (e.g., an embossing plate) provided for embossing a plurality of jet features 28 through the molten or rubber-like material of the nozzle surface layer 24 of the printhead body 12. As shown, the nozzle master die 26 includes a plurality of members 30 protruding from a printhead facing surface 32, wherein each of the plurality of members 30 is configured for forming a corresponding jet feature 28. Where voids (e.g., voids 19 in FIG. 1B) are formed through the material of the nozzle surface layer 20, the members 300 will align with, and be generally larger than, the voids. Accordingly, the spacings, shapes, sizes, etc. of the plurality of members 30 should substantially mimic those desired for the plurality of jet features 28. Since the ink ejected from the jet features 28 is supplied from the manifold features 18, it should be apparent that the placement (e.g., the locations) of the members 30 should substantially align with the manifold features 18. Additionally, an extent 34 of each of the plurality of members 30 from the printhead facing surface 32 is at least equal to a thickness 36 of the nozzle surface layer 20.

Figure 1E:
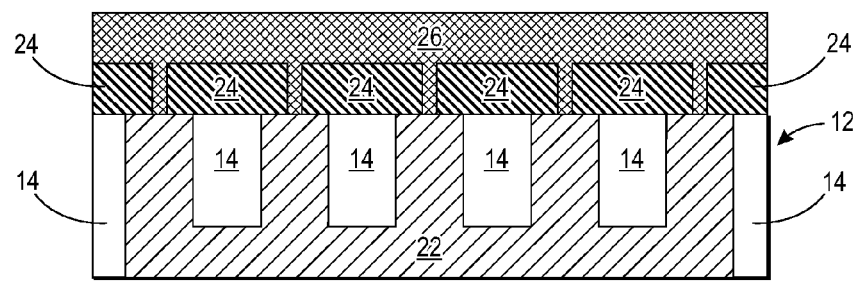
Figure 1F:
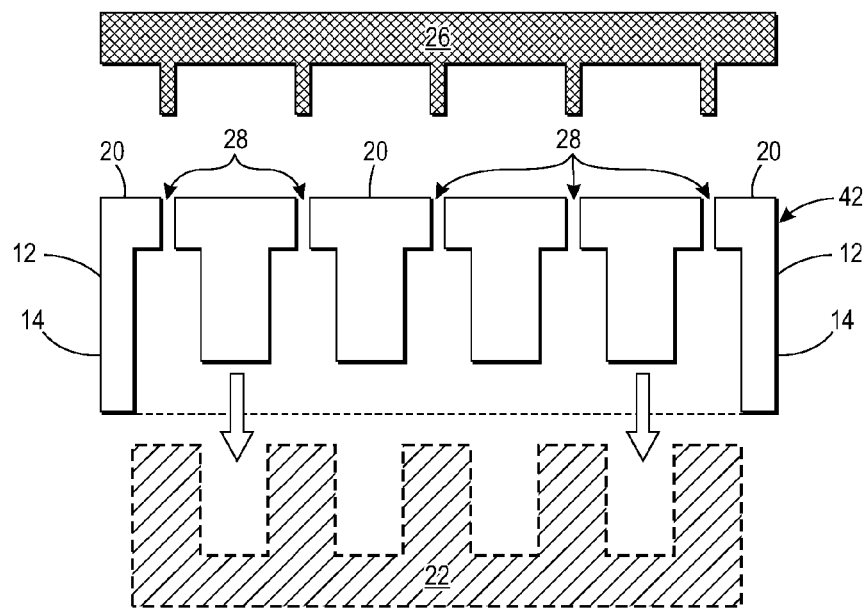

As illustrated in FIG. 1D, the nozzle master die 26 and the printhead body 12 are adjacently positioned with the molten nozzle surface layer 24 and the printhead facing surface 32 opposite one another (e.g., facing each other) and the manifold features 18 and the members 30 substantially aligned with each other. The printhead body 12 and the nozzle master die 26 are then translated towards each other, as indicated by the directional arrow 38, such that the members 30 penetrate and extend through the molten or rubber-like material of the nozzle surface layer 24 until, as shown in FIG. 1E, a tip 40 of each member 30 contacts (or is in close proximity of) the sacrificial material 22 in the manifold features 18. As illustrated in FIG. 1F, both the sacrificial material 22 and the nozzle master die 26 are then removed to yield a molded printhead 42 defined at least in part by the molded printhead body 12 having the plurality of jet features 28 extending from the manifold features 18.

It should be clearly understood that one or more of the plurality of jet features 28 can be of any shape and size, including cylindrical, conical, square, rectangular, etc. Such features and/or the relative spacing of the jet features 28 will be governed by the application or purpose for which the printhead 42 will be used. For certain applications, the dimensional requirements for the jet features 28 may be stringent because small deviations in the shape and/or size can cause misplaced drops and printing artifacts that destroy image quality. In some embodiments, the nozzle orifices formed by the jet features 28 are on the order of 30 to 50 microns.

As will be apparent, the nozzle master die 26 should be fabricated of a material capable of withstanding at least the glass transition temperature $T_g$ of the material 14 used for fabricating (e.g., molding or forming) the printhead body 12. In some embodiments, the printhead body 12 is micromachined or etched or fabricated using a metal or a sacrificial material or a thermoplastic material (e.g., polymer, resin). In certain embodiments, the sacrificial material used for the nozzle master die 26 is similar to the sacrificial material 22 filling the manifold features 18. The sacrificial material can be removed by reacting, melting or gasification at a temperature that is both greater than the glass transition temperature $T_g$ and less than the melting temperature $T_m$ of the material 14 used for fabricating the printhead body 12.

Figure 2:
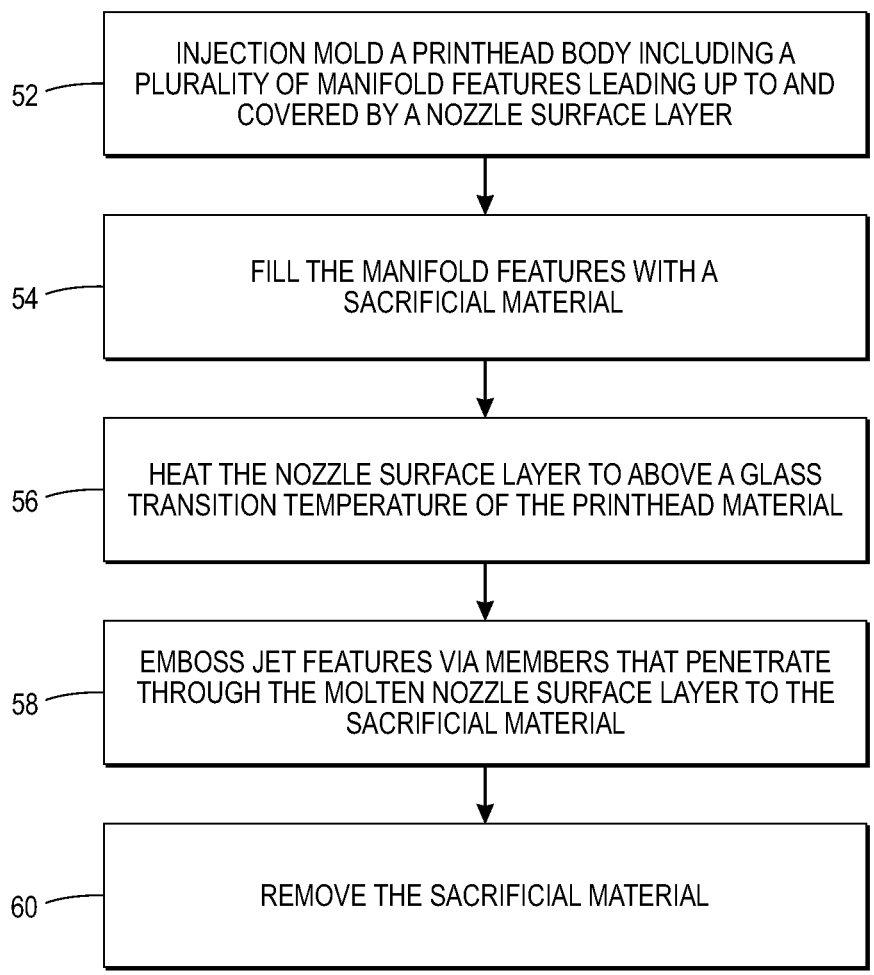
FIG. 2 is a flowchart representation of the method of FIG. 1.

FIG. 2 is a flowchart representation of the method of fabricating the printhead 42 as illustrated in FIGS. 1A-1F. Material 14 is injected 52 into an injection molder wherein a high precision injection mold 16 is used for fabricating the printhead body 12 having the plurality of manifold features 18. The manifold features 18 lead up to, and are covered by, the material forming the nozzle surface layer 20. After the printhead body 12 is removed from the mold 16 and cooled, the manifold features 18 are filled 54 with the sacrificial material 22. The nozzle surface layer 20 is then heated 56 to above the glass transition temperature $T_g$ of the material 14. The plurality of jet features 28 are embossed 58 in the printhead body 12 by penetrating the plurality of members 30 of the nozzle master die 26 through the molten or rubber-like material of the nozzle surface layer 24 to the sacrificial material 22 in the manifold features 18. The sacrificial material 22 and the nozzle master die 26 are removed 60 to yield the printhead 42 having the plurality of integrated jet features 28.

FIGS. 3A-3E illustrate another embodiment of a method of fabricating a printhead having a plurality of integrated inkjet nozzles, wherein elements that are substantially similar to those described elsewhere are designated with like numerals.

Figure 3A:
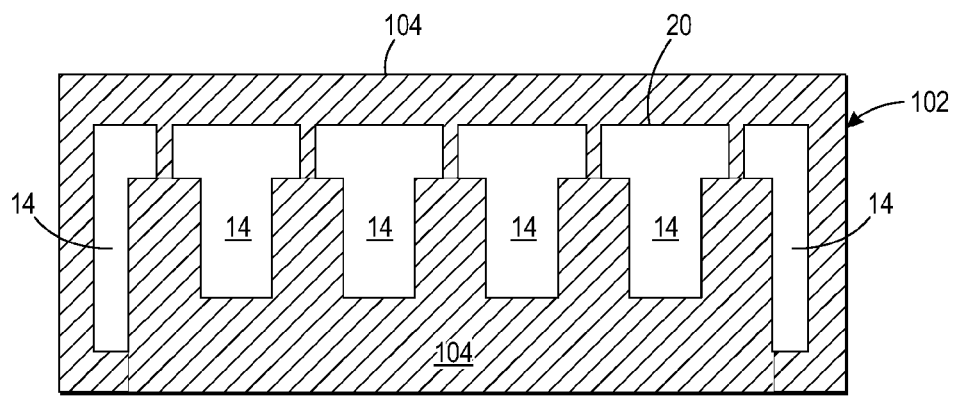
FIGS. 3A-3E illustrate another embodiment of a method of fabricating a printhead having a plurality of integrated inkjet nozzles.
Figure 3B:
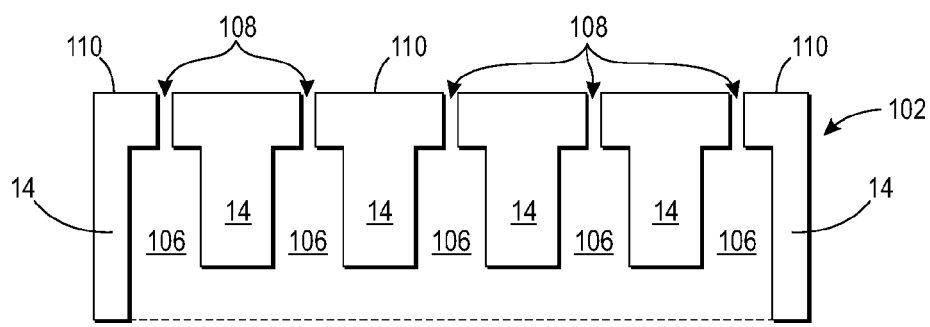
Figure 3C:
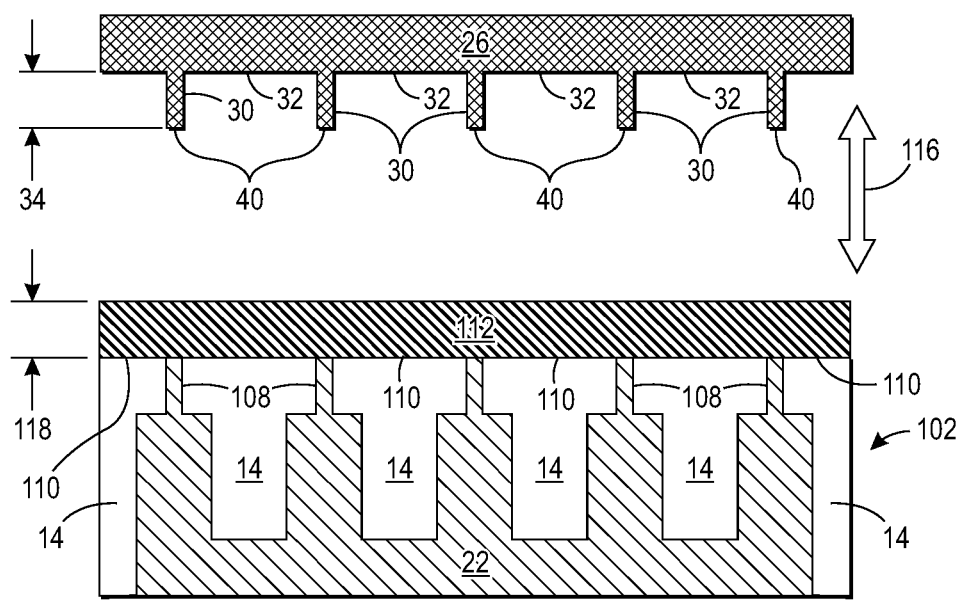

As shown in FIG. 3A, a printhead body 102 is molded (e.g., formed) by injecting the material 14 into a high precision injection mold 104. In some embodiments, the mold 104 is configured to yield the molded printhead body 102 having a plurality of manifold features 106 that include voids 108 at an outer surface 110 of the printhead body 102. As shown in FIG. 3C, the manifold features 106 are filled with the sacrificial material 22 after the printhead body 102 has been removed from the mold 104 and cooled. The outer surface 110 is then covered with a molten or rubber-like material to form a nozzle surface layer 112 over the voids 108. In some embodiments, the material used for the nozzle surface layer 112 is substantially similar to the material used for the nozzle surface layer 24 described elsewhere. The nozzle master die 26 is used for embossing a plurality of jet features 114 through the material of the nozzle surface layer 112.

Figure 3D:
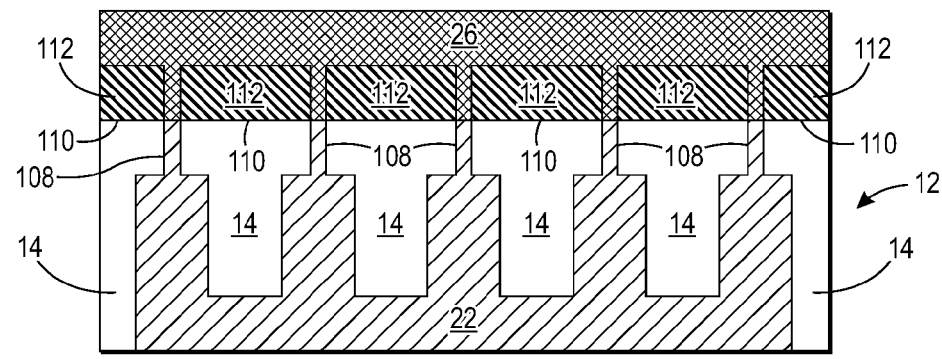
Figure 3E:
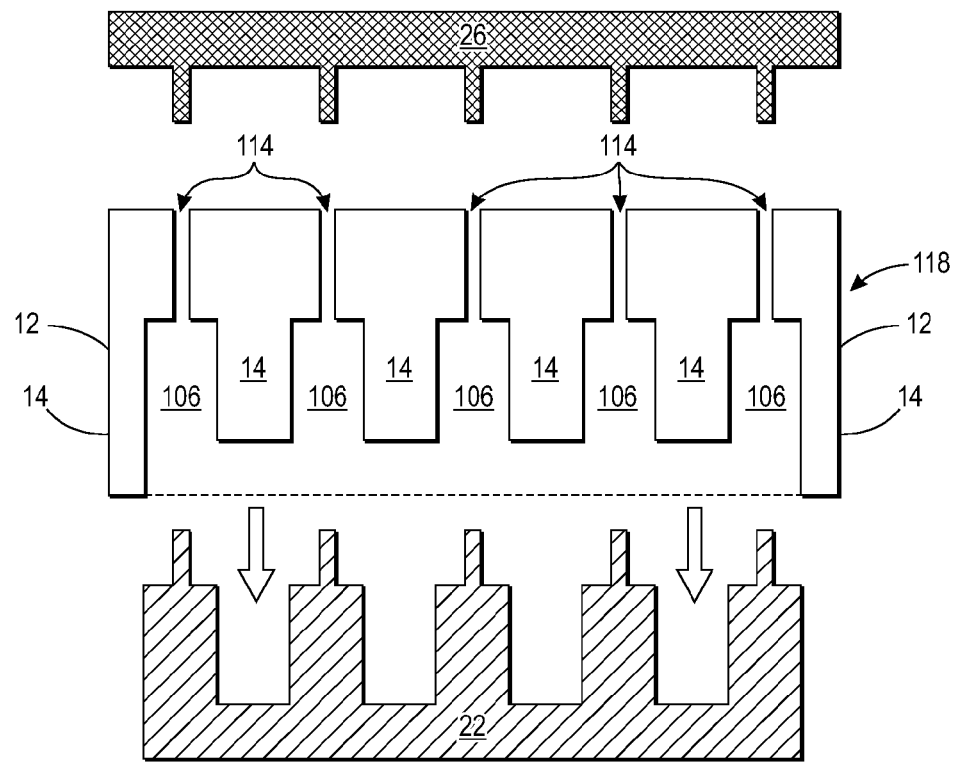

The nozzle master die 26 and the printhead body 102 are adjacently positioned with the nozzle surface layer 112 and the printhead facing surface 32 opposite one another (e.g., facing each other) and the voids 108 and the members 30 substantially aligned with each other. The printhead body 102 and the nozzle master die 26 are then translated towards each other, as indicated by the directional arrow 116, such that the members 30 penetrate and extend through the material of the nozzle surface layer 112 until, as shown in FIG. 3D, a tip 40 of each member 30 contacts (or is in close proximity of) the sacrificial material 22 in the manifold features 106. It should be evident that the extent 34 of each of the plurality of members 30 from the printhead facing surface 32 is at least equal to a thickness 118 of the material forming the nozzle surface layer 112. Both the sacrificial material 22 and the nozzle master die 26 are then removed to yield a molded printhead 120 defined at least in part by the molded printhead body 102 having the plurality of jet features 114 extending from the manifold features 106.

In some embodiments, the printhead body 12 and the printhead body 102 are fabricated in a substantially similar manner, albeit with somewhat different features, e.g., the absence or presence of the voids 108. In certain embodiments, the jet features 28 and the jet features 114 are substantially similar to each other.

Figure 4:
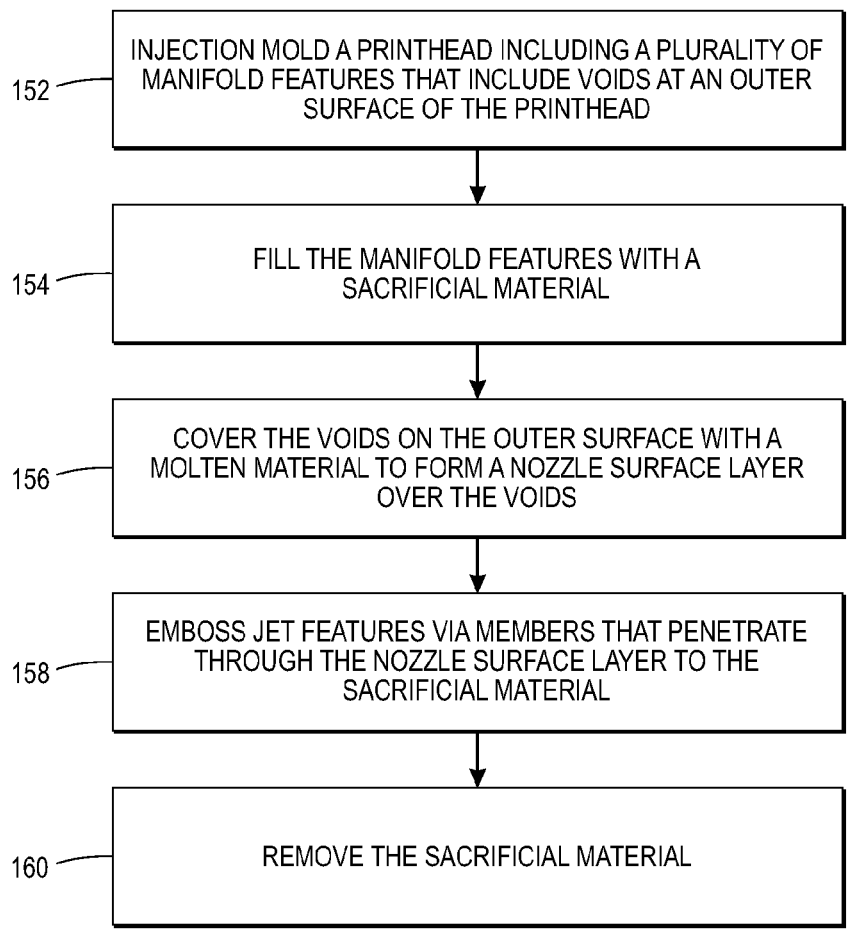
FIG. 4 is a flowchart representation of the method of FIG. 3.

FIG. 4 is a flowchart representation of the method of fabricating the printhead 118 as illustrated in FIGS. 1A-1F. Material 14 is injected 152 into an injection molder wherein a high precision injection mold 104 is used for fabricating the printhead body 102 having the plurality of manifold features 106 and voids 108 at the outer surface 110. The manifold features 106 are filled 154 with the sacrificial material 22, and the voids 108 on the outer surface 110 are covered 156 with a molten material to form the nozzle surface layer 112. The plurality of jet features 28 are embossed 158 in the printhead body 102 by penetrating the plurality of members 30 of the nozzle master die 26 through the material of the nozzle surface layer 112 to the sacrificial material 22 in the manifold features 106. The sacrificial material 22 and the nozzle master die 26 are removed 160 to yield the printhead 120 having the plurality of integrated jet features 114.

Although not specifically identified, it should be readily apparent to a person having ordinary skill in the art that the embodiments described herein may include an injection molder for injection molding the printhead body 12, an injector for filling the manifold features 18 with the sacrificial material 22, and an oven for heating the nozzle surface layer 20, wherein the nozzle master die 26 is an embossing plate having the plurality of members 30 used for embossing the plurality of jet features 28.

The foregoing detailed description of the various embodiments is not intended to be exhaustive and should not be considered restrictive or limiting the intended spirit and scope of the instant disclosure. While multiple embodiments have been disclosed, modifications thereof and/or alternate embodiments may become apparent to a person having ordinary skill in the art. Any and all such embodiments, applied individually or in any combination, are considered as being within the metes and bounds of the instant disclosure.

What is claimed is:

1. A method comprising:
   injection molding a printhead, the printhead including a plurality of manifold features that lead up to a nozzle surface layer;
   filling the manifold features with a sacrificial material;
   heating the nozzle surface layer to above a glass transition temperature;
   embossing jet features via members that penetrate through the nozzle surface layer to the sacrificial material; and
   removing the sacrificial material.

2. The method of claim 1, wherein the printhead is injection molded such that the nozzle surface layer covers the manifold features.

3. The method of claim 1, wherein the printhead is injection molded such that the manifold features comprise voids through an intermediary surface under the nozzle surface layer, and wherein heating the nozzle surface layer above the glass transition temperature comprises heating a polymer above a melting point and covering the sacrificial features with the polymer to form the nozzle surface layer.

4. The method of claim 1, wherein removing the sacrificial material comprises heating the sacrificial material, the sacrificial material decomposing into a gas in response thereto.

5. The method of claim 1, wherein the printhead is injection molded with polymer having a melting point above 280 degrees C., the glass transition temperature being below 280 degrees C.

6. The method of claim 5, wherein the sacrificial material comprises a poly-lactic acid.

7. The method of claim 1, wherein the printhead is injection molded with a polymer having a melting point above 400 degrees C. and a glass transition temperature below 400 degrees C.

8. The method of claim 7, wherein t, wherein the sacrificial material comprises polynorbornene.

9. The method of claim 1, wherein the jet features comprise 30 micron to 50 micron nozzle orifices.

10. A method comprising:
    injection molding a printhead, the printhead including a plurality of manifold features that are covered by a nozzle surface layer;
    filling the manifold features with a sacrificial material;
    heating the nozzle surface layer to above a glass transition temperature;
    embossing jet features via members that penetrate through the nozzle surface layer to the sacrificial material; and
    removing the sacrificial material.

11. The method of claim 10, wherein removing the sacrificial material comprises heating the sacrificial material, the sacrificial material decomposing into a gas in response thereto.

12. The method of claim 10, wherein the printhead is injection molded with polymer having a melting point above 280 degrees C., the glass transition temperature being below 280 degrees C.

13. The method of claim 10, wherein the printhead is injection molded with a polymer having a melting point above 400 degrees C. and a glass transition temperature below 400 degrees C.

14. The method of claim 10, wherein the jet features comprise 30 micron to 50 micron nozzle orifices.

15. A method comprising:
    injection molding a printhead, the printhead including a plurality of manifold features that include voids at an outer surface of the printhead;
    filling the manifold features with a sacrificial material;
    covering the outer surface with a melted polymer that forms a nozzle surface layer over the voids;
    embossing jet features via members that penetrate through the nozzle surface layer to the sacrificial material; and
    removing the sacrificial material.

16. The method of claim 15, wherein removing the sacrificial material comprises heating the sacrificial material, the sacrificial material decomposing into a gas in response thereto.

17. The method of claim 15, wherein the printhead is injection molded with polymer having a melting point above 280 degrees C., the glass transition temperature being below 280 degrees C.

18. The method of claim 15, wherein the printhead is injection molded with a polymer having a melting point above 400 degrees C. and a glass transition temperature below 400 degrees C.

19. The method of claim 15, wherein the jet features comprise 30 micron to 50 micron nozzle orifices.

* * * * *